US006687047B2

(12) United States Patent
Clark et al.

(10) Patent No.: US 6,687,047 B2
(45) Date of Patent: Feb. 3, 2004

(54) SHARED FORWARD PUMPING IN OPTICAL COMMUNICATIONS NETWORK

(75) Inventors: Thomas Clark, Columbia, MD (US); William Shieh, Columbia, MD (US); Vladimir Petricevic, Columbia, MD (US)

(73) Assignee: Dorsal Networks, Inc., Columbia, MD (US)

( * ) Notice: Subject to any disclaimer, the term of this patent is extended or adjusted under 35 U.S.C. 154(b) by 234 days.

(21) Appl. No.: 09/865,440

(22) Filed: May 29, 2001

(65) Prior Publication Data

US 2002/0181859 A1 Dec. 5, 2002

(51) Int. Cl.$^7$ .............................. H04B 10/12; G02B 6/42
(52) U.S. Cl. ..................... 359/341.1; 359/334; 385/42
(58) Field of Search ................. 359/341.1–341.2, 359/341.3, 341.31, 341.32, 341.33; 385/24, 42; 372/6

(56) References Cited

U.S. PATENT DOCUMENTS

| | | | |
|---|---|---|---|
| 3,705,992 A | 12/1972 | Ippen et al. | |
| 4,401,364 A | 8/1983 | Mochizuki | |
| 4,616,898 A | 10/1986 | Hicks, Jr. | |
| 4,805,997 A | 2/1989 | Asahara et al. | |
| 5,173,957 A | 12/1992 | Bergano et al. | |
| 5,241,414 A * | 8/1993 | Giles et al. | 359/341.33 |
| 5,760,949 A * | 6/1998 | Motoshima et al. | 359/341.33 |
| 5,764,405 A | 6/1998 | Alphonsus | |
| 5,912,761 A | 6/1999 | Jander et al. | |
| 5,914,799 A * | 6/1999 | Tan | 359/167 |
| 5,920,423 A * | 7/1999 | Grubb et al. | 359/341.33 |
| 5,930,029 A * | 7/1999 | Mehuys | 359/341.33 |
| 5,933,270 A * | 8/1999 | Toyohara | 359/341.3 |
| 5,959,767 A * | 9/1999 | Fatehi et al. | 359/341.3 |
| 5,991,069 A | 11/1999 | Jander | |
| 6,122,298 A | 9/2000 | Kerfoot, III et al. | |
| 6,130,899 A * | 10/2000 | Epworth et al. | 359/342 |
| 6,181,464 B1 | 1/2001 | Kidorf et al. | |
| 6,292,288 B1 | 9/2001 | Akasaka et al. | |
| 6,297,903 B1 * | 10/2001 | Grubb et al. | 359/341.3 |
| 6,327,077 B1 * | 12/2001 | Okazaki | 359/341.3 |
| 6,414,786 B1 * | 7/2002 | Foursa | 359/334 |

OTHER PUBLICATIONS

S. Namiki and Y. Emori, Abstract of *Recent Advances in Ultra–Wideband Raman Amplifiers*, Opto–Technology Lab.
A. Berntson, et al., *Influence of Cross–Talk and Pump Depletion on the Design of Raman Amplifiers of WDM Systems*, Optical Network Research Laboratory.
Jianping Zhang, et al., *Dependence of Raman Polarization Dependent Gain on Pump Degree of Polarization at High Gain Levels*, 1999, pp. 13–15, Optical Society of American.
M. Murakami, et al., *Long–Haul 16x10 WDM Transmission Experiment Using Higher Order Fiber Dispersion Management Technique*, NTT Network Services Systems Laboratories, Sep. 1998, pp. 313–314, Madrid, Spain.

(List continued on next page.)

*Primary Examiner*—Michael P. Stafira
*Assistant Examiner*—Juan D Valentin, II

(57) ABSTRACT

A pump assembly for an optical amplifier includes a plurality of pump radiation sources, each pump radiation source producing radiation at a respective one of a first number of pump wavelengths. A coupler is optically coupled to each of the plurality of pump radiation sources, receives each of the first number of pump wavelengths from the plurality of pump radiation sources, and outputs each of the first number of pump wavelengths to each one of a second number of outputs. The pump assembly also includes a plurality of pump signal combiners, each pump signal combiner optically coupled to a respective one of the second number of outputs of the coupler and receiving each of the first number of pump wavelengths output from the coupler. Each pump signal combiner placing each of the first number of pump wavelengths output from the coupler in co-propagation with a respective one of a plurality of data signals propagating on a respective one of a plurality of optical fibers.

21 Claims, 7 Drawing Sheets

OTHER PUBLICATIONS

Yoshihiro Emori and Shu Namiki, *Demonstration of Broadband Raman Amplifiers: a Promising Application of High-Power Pumping Unit*, Funukawa Review, pp. 59–62, Nov. 19, 2000.

Howard Kidorf, et al., *Pump Interactions in a 100–nm Bandwidth Raman Amplifier*, IEEE Photonics Technology Letters, pp. 530–532, vol. 11, No. 5, May 1999.

Neal S. Bergano, *Chapter 10, Undersea Amplified Lightwave Systems Design*, Optical Fiber Telecommunications IIIA, 1997, pp. 302–335.

Daniel T. Van Atta et al., AT&T Technical Journal, Jan./Feb. 1995, vol. 74, No. 1.

* cited by examiner

SHARED FORWARD PUMPING IN OPTICAL COMMUNICATIONS NETWORK

FIELD OF THE INVENTION

The present invention relates generally to optical communications, and more particularly to a pump assembly for Raman amplification with a shared forward propagating pump.

BACKGROUND OF THE INVENTION

In a long-haul optical transmission system, an optical data signal is transmitted over an optical fiber at distances that typically approach five to ten thousand kilometers. As the optical data signal travels over the optical fiber, the power of the data signal diminishes or attenuates. The attenuation limits the distance the optical data signal can travel to substantially shorter than five thousand kilometers.

To overcome the power loss of the optical data signal, the long-haul optical transmission system typically includes a series of pump modules. The pump modules provide power to be transferred to the optical data signal as it propagates on the optical fiber. This amplification may be implemented using the Raman effect.

Raman amplification uses stimulated Raman scattering to amplify the optical data signal. In stimulated Raman scattering, radiation power from a pump radiation source is transferred to the optical data signal. The Raman gain material for Raman amplification can be the transmission optical fiber itself, known as distributed Raman amplification. Alternatively, it could be a separate fiber chosen specifically for its Raman effect, known as discrete Raman amplification.

The Raman gain coefficient for a silica glass fiber, which is typically used in optical communications, is shown in FIG. 1 as a function of the frequency shift relative to the pump frequency. As shown in FIG. 1, the largest gain occurs at about 13 THz, which corresponds to a 100 nm shift for a 1400 nm pump. Thus, the maximum gain for a single pump wavelength of about 1400 nm will occur at a signal wavelength of about 1500 nm. The gain of the optical data signal from a Raman amplifier is the product of the Raman gain coefficient, the pump intensity, and the length of the interaction medium.

For Raman amplification, the optical data signal is typically amplified by providing a counter-propagating pump in the optical fiber. The counter-propagating pump is generated in a pump module and provides energy for the amplification process. Since the counter-propagating pump attenuates as it travels in the fiber, amplification is greatest near (approximately between 5 and 20 km) and just prior to the pump module. After passing through the pump module, however, the optical data signal is not amplified again until it reaches the length of the optical fiber proximate to the next pump module. As a result, the power of the optical data signal leaving the pump module needs to be relatively high, due to attenuation in the transmission fiber, to enable the optical data signal to reach the length of the optical fiber where it is amplified by the counter-propagating pump of the next pump module.

In addition to amplifying the optical data signal as it propagates on the optical fiber to compensate for attenuation, it is desirable to maximize the optical signal to noise ratio (OSNR) of the optical data signal and to reduce the nonlinearities that affect the transmission of the optical data signal. In particular, as the power of the optical data signal drops, the transmission system OSNR typically drops due to normally constant sources of noise in subsequent optical amplifiers or the photodetection process. It is therefore desirable to have the power be relatively high when the optical data signal leaves the pump module. Increasing the power of the optical data signal, however, increases the nonlinearities that destroy the signal. As a result, the desire to maximize the OSNR and reduce the nonlinearities work against each other.

It is known that a single wavelength pump may be used to provide a forward-propagating pump, also referred to as a co-propagating pump, in conjunction with the counter-propagating pump. The forward-propagating pump reduces the degradation of the OSNR by providing gain to the optical data signal in the length of the optical fiber after the pump module. In addition, the gain provided by the forward-propagating pump reduces the required launch power for the optical data signal, i.e., the power of the optical data signal leaving the pump module. The reduction in launch power reduces the nonlinearities that affect the transmission of the optical data signal.

SUMMARY OF THE INVENTION

Briefly, in one aspect of the present invention, a pump assembly for an optical amplifier consistent with the present invention includes a plurality of pump radiation sources, each pump radiation source producing radiation at a respective one of a first number of pump wavelengths, and a coupler, optically coupled to each of the plurality of pump radiation sources, which receives the radiation at each of the first number of pump wavelengths from the plurality of pump radiation sources and outputs the radiation at each of the first number of pump wavelengths to each one of a second number of outputs. The pump assembly also includes a plurality of pump signal combiners, each pump signal combiner optically coupled to a respective one of the second number of outputs of the coupler and receiving the radiation at each of the first number of pump wavelengths output from the coupler, each pump signal combiner placing the radiation at each of the first number of pump wavelengths output from the coupler in co-propagation with a respective one of a plurality of data signals propagating on a respective one of a plurality of optical fibers.

In another aspect of the present invention, the first number and the second number are each at least two, and the first number and the second number are equal or are not equal.

In yet another aspect of the present invention, each of the first number of pump wavelengths have approximately the same wavelength or have different wavelengths, where the difference in wavelength between the shortest pump wavelength and the longest pump wavelength is approximately 10 nm.

In another aspect of the present invention, the first number of pump wavelengths interact with the data signals propagating on the optical fibers to amplify the data signals.

DETAILED DESCRIPTION OF THE PREFERRED EMBODIMENT

Figure 1:
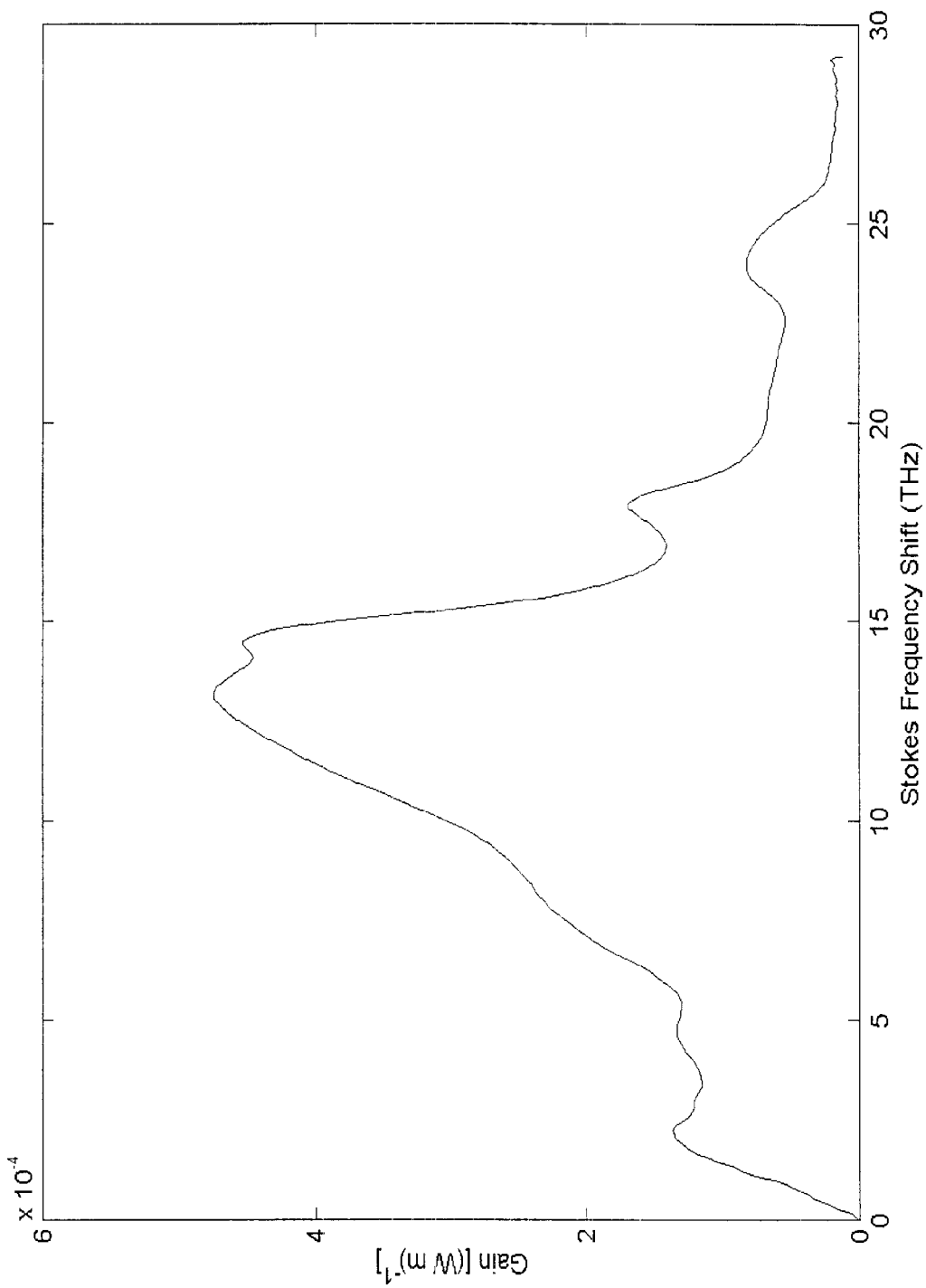
FIG. 1 shows a Raman gain coefficient for a silica glass fiber as a function of the frequency shift relative to the pump frequency.
Figure 2:
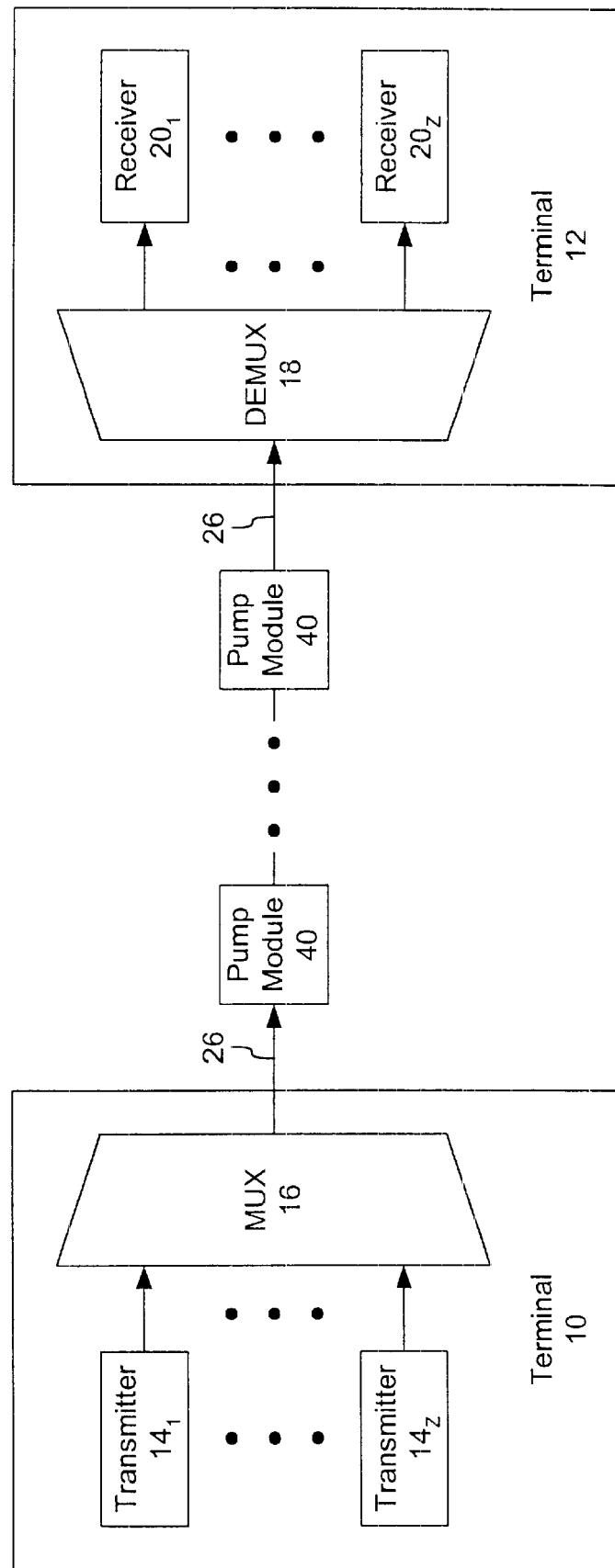
FIG. 2 is a block diagram of a long-haul fiber optical communication system consistent with the present invention.

FIG. 2 is a block diagram of a long-haul fiber optical communication system consistent with the present invention. As shown in FIG. 2, the system includes a transmitter terminal 10 and a receiver terminal 12. The transmitter terminal includes a number of optical communication transmitters 14a to 14z respectively transmitting signals at optical communications wavelengths $\lambda a$ to $\lambda z$, where z is an integer corresponding to the total number of wavelengths being transmitted. In one aspect of the present invention, the number z of optical communications wavelengths is between approximately 200 and 400, although other numbers of wavelengths may be used. For example, the number of wavelengths may be 256, 320 or 384.

The optical communications wavelengths are multiplexed by multiplexer (MUX) 16 into a multiplexed optical data signal, which is amplified in the transmission fiber with pump power provided by a series of pump modules 40. The multiplexed data signal is transmitted from the transmitter 10 to the pump modules 40, between the pump modules 40, and from the pump modules 40 to the receiver 12 via one or more transmission optical fibers 26. For pump modules 40 implemented with distributed Raman amplification, the pump module 40 will also include transmission optical fiber. The multiplexed data signal is then demultiplexed by demultiplexer (DEMUX) 18 of receiver terminal 12 into optical communications wavelengths $\lambda a$ to $\lambda z$. The demultiplexer 18 provides optical communications wavelengths $\lambda a$ to $\lambda z$ to respective optical communications receivers 20a to 20z.

Although FIG. 2 shows signals directed from transmitter terminal 10 to receiver terminal 12, in general the transmitter terminal 10 and receiver terminal 12 are typically transmitter/receiver terminals for bidirectional communication. In this case, each of the transmitter/receiver terminals will have transmitters as well as receivers, both a multiplexer and demultiplexer, and another transmission fiber. For ease of illustration, however, the bidirectional communication has not been shown.

The amplification architecture in the pump modules 40 provide pump light into optical fibers 26 and amplify the data signals traveling in the optical fibers 26. The gain profile for Raman amplification has a typical bandwidth of 20–30 nm for a single pump wavelength. For wavelength division multiplexed (WDM) optical communications applications where a broad range of wavelengths must be amplified, this 20–30 nm bandwidth is too narrow. To broaden the gain profile (gain bandwidth), Raman amplification employing multiple pump wavelengths over a broad wavelength range may be used in WDM optical communication applications. Preferably, pump wavelengths and pump power levels are selected to result in a constant or flat gain over the desired broad wavelength range.

In order for a flat gain profile to be achieved, the pump-pump interactions generally require that the shorter wavelength pump sources have a higher pump power than the longer wavelength pump sources. This difference in power results from the effect of energy from the shorter wavelength (higher photon energy) pumps being transferred to the longer wavelength pumps due to stimulated Raman scattering. To compensate for the pump-pump energy loss at shorter wavelengths, the shorter pump wavelengths preferably have the highest power.

Figure 3:
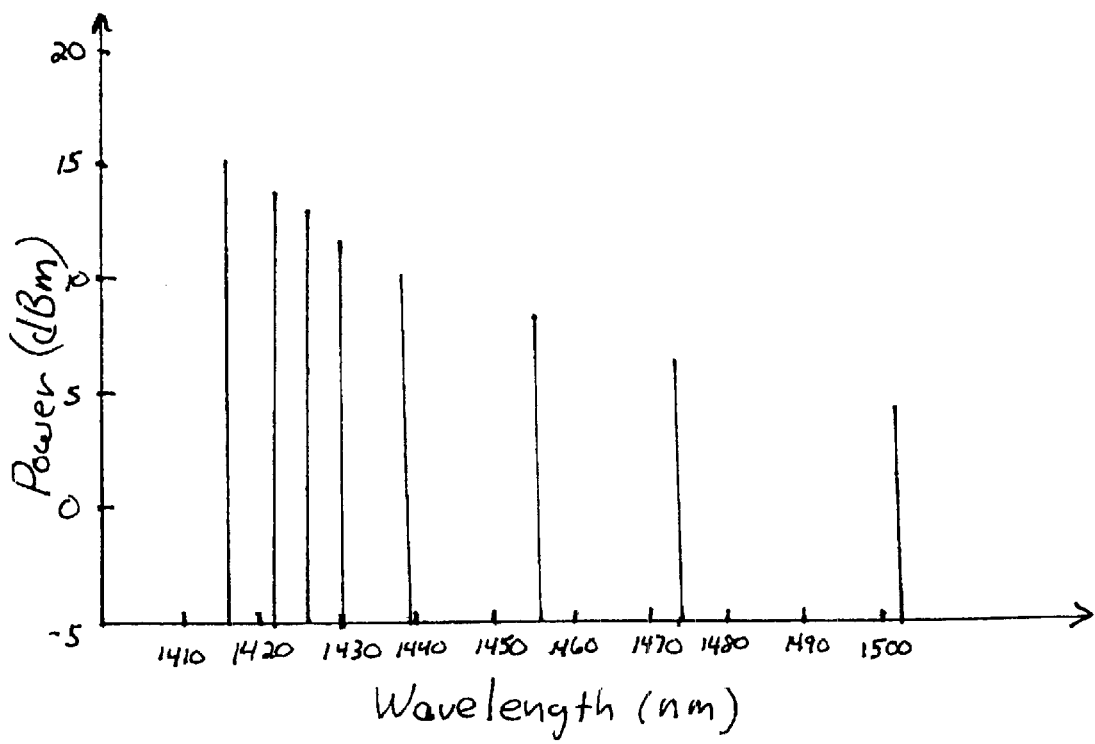
FIG. 3 shows a pump power-pump wavelength scheme to achieve a relatively flat and broad Raman gain profile consistent with the present invention.
Figure 4:
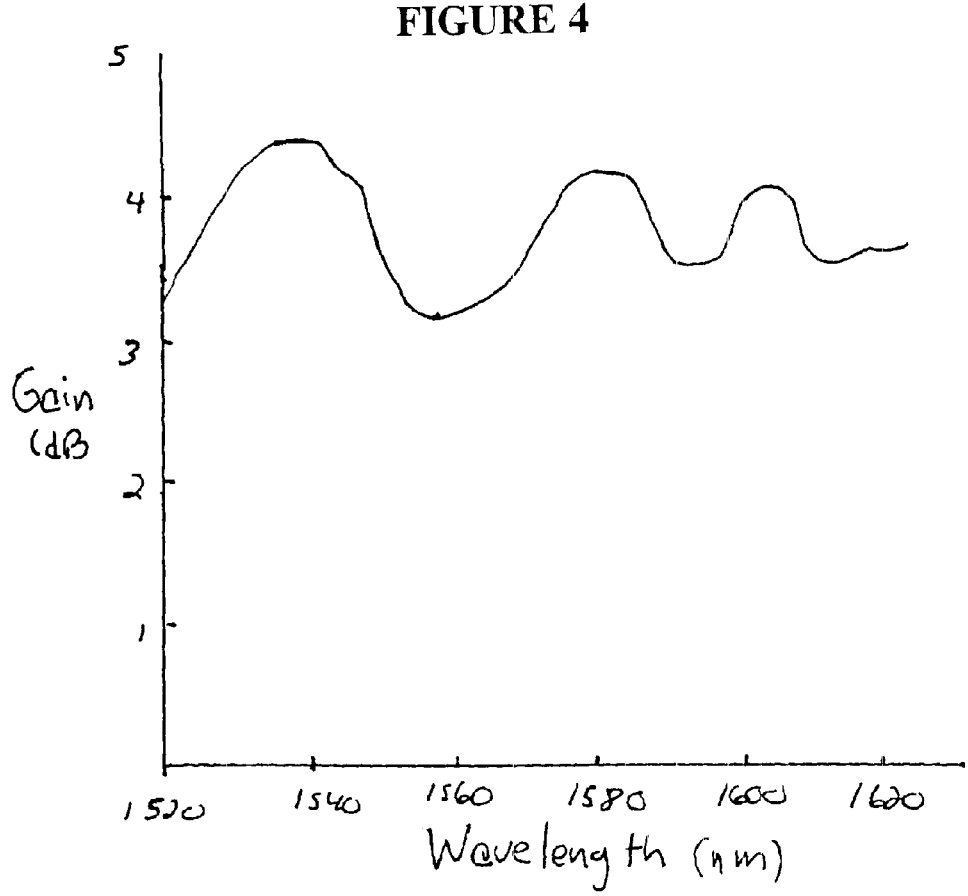
FIG. 4 shows a relatively flat and broad Raman gain profile for a pump power-pump wavelength scheme similar to that of FIG. 3.

A typical pump power—pump wavelength scheme to achieve a relatively flat and broad Raman gain profile is illustrated in FIG. 3 for the case of eight pump wavelengths. As can be seen in FIG. 3, the pump power decreases for increasing wavelength. Also, the spacing between wavelengths is closer for shorter wavelengths. FIG. 4 illustrates a relatively flat and broad Raman gain profile for a pump power-pump wavelength scheme similar to that of FIG. 3. The variations on the gain spectrum result in channel-to-channel variation in the optical-signal-to-noise-ratio (OSNR) and absolute signal power of the optical data signal. Because system performance is limited by the OSNR of the worst performing wavelength, a large variation can severely limit system transmission distance. The maximum difference of the gain within the desired spectral range of signals is called gain ripple. The gain ripple of an amplifier should be as small as possible. This can be achieved by properly selecting the pump wavelengths and powers. As can be seen from the measurement in FIG. 4, the gain ripple over the wavelength range of 1520 to 1620 nm is smaller than 1.5 dB.

Figure 5:
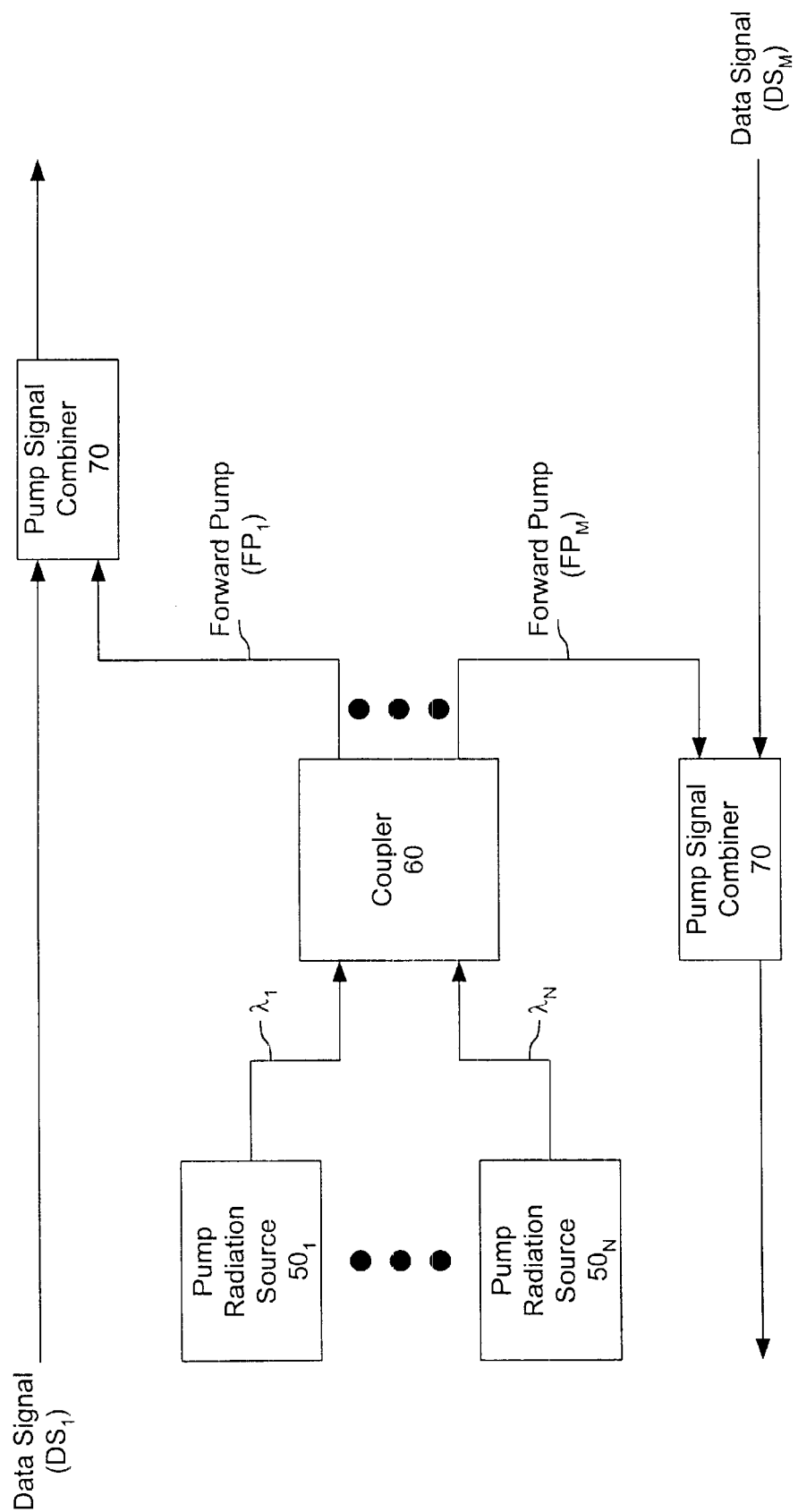
FIG. 5 is a block diagram of a Raman amplification architecture for generating a forward-propagating pump consistent with the present invention.

As described above, to improve OSNR and reduce nonlinearities, it is desirable to use a forward-propagating pump in conjunction with a counter-propagating pump. FIG. 5 is a block diagram of a Raman amplification architecture for generating a forward-propagating pump consistent with the present invention. As shown in FIG. 5, the architecture includes a plurality of pump radiation sources $50_1$ to $50_N$, a coupler 60, and a plurality of pump signal combiners 70.

The pump radiation sources $50_1$ to $50_N$ each comprise one or more individual radiation emitters. The individual radiation emitters may be lasers or light emitting diodes, for example. The lasers may be fiber lasers, fiber coupled microchip lasers, or semiconductor lasers, for example. The pump radiation sources $50_1$ to $50_N$ produce pump wavelengths $\lambda_1$ through $\lambda_N$, respectively. The pump wavelengths $\lambda_1$–$\lambda_N$ are provided to a respective one of N input ports of the coupler 60, which couples or combines the pump wavelengths. The coupler 60 may be, for example, a fused fiber coupler or a waveguide coupler. Although the architecture of FIG. 5 shows the number of input ports of the coupler 60 is equal to the number of pump wavelengths, it is also possible for the number of input ports to be more than or less than the number of pump wavelengths.

The combined wavelengths are output at each of M output ports of the coupler 60. Each of the output ports of the coupler 60 outputs the combined wavelengths as one of M forward pumps ($FP_1$–$FP_M$). Each forward pump $FP_1$–$FP_M$ is coupled to a respective pump signal combiner 70. The pump signal combiner 70 places the received forward pump in co-propagation with a respective one of M data signals ($DS_1$–$DS_M$) to provide Raman amplification of the data signals $DS_1$–$DS_M$. Although the architecture of FIG. 5 shows the number of output ports of the coupler 60 is equal to the number of pump signal combiners 70, it is also possible for the number of output ports to be more or less than the number of pump signal combiners 70.

The values for the pump wavelengths $\lambda_1$–$\lambda_N$ are preferably between 1410 nm and 1420 nm, although other wavelengths may be used. In one aspect of the present invention, the pump wavelengths $\lambda_1$–$\lambda_N$ are all equal in value. Using the same wavelength provides a measure of reliability and redundancy in the event that one of the pump radiation sources $50_1$ to $50_N$ fails because the remaining pump radiation sources are still generating the same pump wavelength.

Alternatively, the pump wavelengths $\lambda_1$–$\lambda_N$ may be slightly different with the difference between the shortest and longest wavelength preferably being within 3 to 10 nm. Using slightly different wavelengths for the pump wavelengths $\lambda_1$–$\lambda_N$ increases the band of wavelengths in the data signals $DS_1$–$DS_M$ that are amplified by the forward pumps $FP_1$–$FP_M$. The slightly different wavelengths also provide a measure of reliability and redundancy in the event that one of the pump radiation sources $50_1$ to $50_N$ fails. The flatness of the gain using slightly different wavelengths provided by the forward pumps $FP_1$–$FP_M$, however, is compromised if one of the pump radiation sources $50_1$ to $50_N$ fails.

As described above, the coupler 60 has N input ports and M output ports. The values of N and M may be equal to or different from each other. In one aspect of the present invention, the values of N and M are each at least two. Accordingly, the coupler 60 would be at least a 2×2 coupler. In another aspect of the present invention, the values of N and M are each four, which corresponds to a 4×4 coupler. Where the values of N and M are each at least two, multiple pump wavelengths may be combined to form the forward pump, and the forward pump may be placed on multiple optical fibers. As a result, each of the optical fibers shares the forward pump, which comprises multiple pump wavelengths and is generated from a single common arrangement of pump radiation sources.

In a conventional arrangement, each optical fiber receives a forward pump from a single pump radiation source. As a result, if the pump radiation source fails, the optical fiber coupled to that pump radiation source no longer receives a forward pump. In contrast, the architecture for generating the forward pump shown in FIG. 5 provides a redundancy scheme for providing the forward pump to multiple optical fibers. If one of the multiple pump radiation sources fails, the other pump radiation sources still generate pump wavelengths that are combined to form the forward pump received by each of the optical fibers. In addition, if one of the pump radiation sources fails, the power of the remaining pump radiation sources may be increased so that the power of the forward pump remains approximately the same.

As described above, each pump radiation source may include a single radiation emitter, which generates a respective one of the pump wavelengths provided to the coupler 60. Alternatively, each pump radiation source may include a pair of radiation emitters, each of the pair of radiation emitters generating the same pump wavelength. By using the pair of emitters for each pump radiation source, the power for each emitter may be reduced by half. In addition, the pair of emitters may provide an additional measure of redundancy. In the event that one of the pair of emitters fails, the pump radiation source can still generate the pump wavelength with the other emitter, and the power can be equalized by increasing the power of the other emitter.

Figure 6:
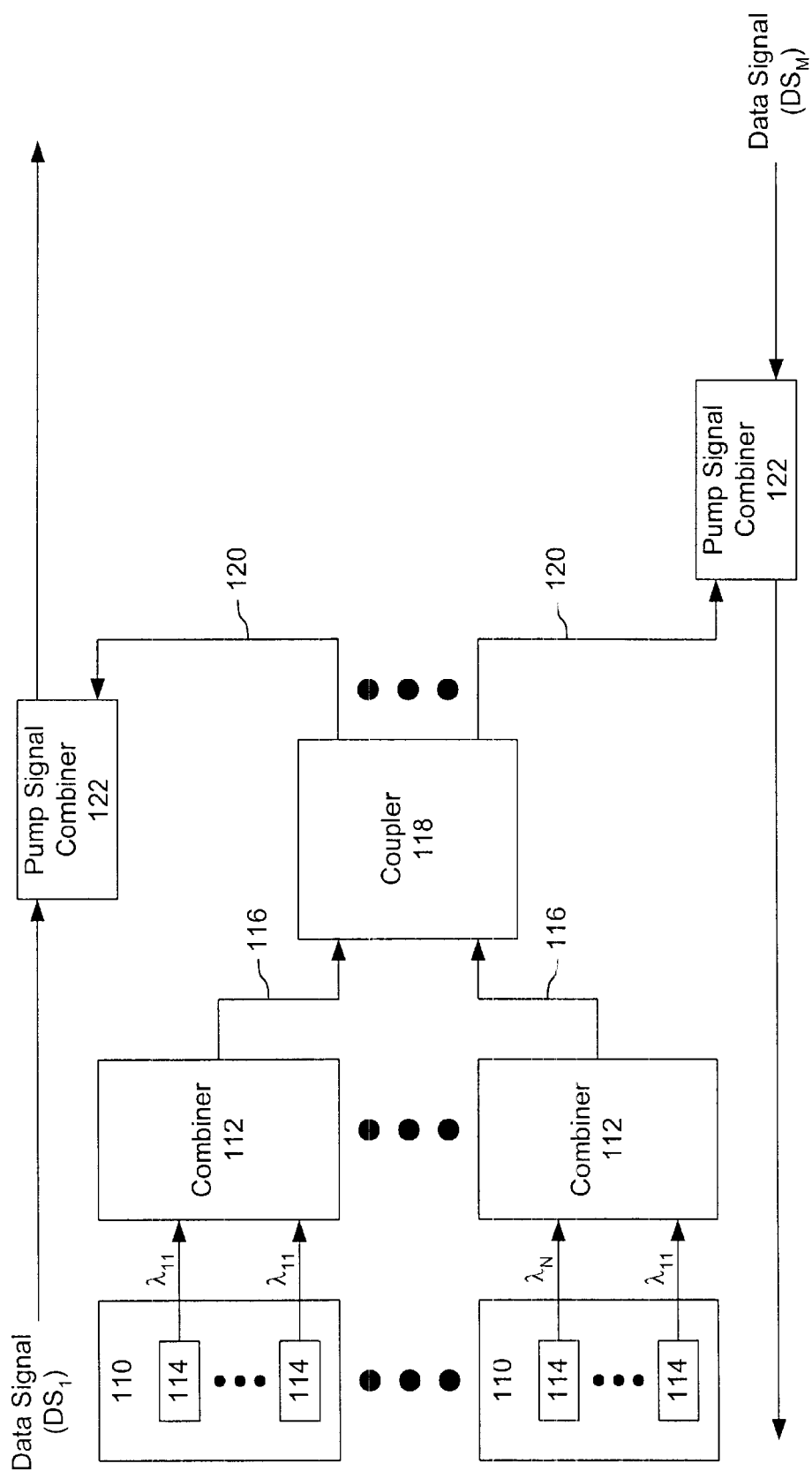
FIG. 6 is a block diagram of a Raman amplification architecture for generating a counter-propagating pump consistent with the present invention.

In another aspect of the present invention, the architecture for generating the forward pump, as shown in FIG. 5, can be combined with an architecture for generating a counter-propagating pump. FIG. 6 is a block diagram of a Raman amplification architecture for generating a counter-propagating pump consistent with the present invention. The architecture includes a number N of pump radiation sources 110 optically coupled to a respective one of N pump radiation combiners 112, where N is any integer greater than one. Alternatively, the number of combiners and pump radiation sources 110 may be unequal.

Each of the pump radiation sources 110 produces radiation having a set of wavelengths $\lambda_{i1}$ to $\lambda_{imi}$, where i designates the ith pump radiation source, and mi is the number of wavelengths generated by the ith pump radiation source. For example, the first pump radiation source generates a set of wavelengths $\lambda_{11}$ to $\lambda_{1m1}$ (m1 is the number of wavelengths generated by the first pump radiation source), while the Nth pump radiation source generates a set of wavelengths $\lambda_{N1}$ to $\lambda_{NmN}$ is the number of wavelengths generated by the Nth pump radiation source). The number of wavelengths generated by each pump radiation source 110 may be the same or different. For example, the value of m1 may be equal to or different from the value of mN.

Like the architecture for generating the forward pump shown in FIG. 5, the pump radiation sources 110 in FIG. 6 may each comprise one or more individual radiation emitters 114, which may be lasers, light emitting diodes, fiber lasers, fiber coupled microchip lasers, or semiconductor lasers. Each of the pump radiation sources 110 produces radiation having a set of pump wavelengths and pump powers corresponding to the pump wavelengths. The pump wavelengths and pump powers of each set are generally different from those of another set. Thus, in general, it is possible to have a large number of different pump wavelengths and/or pump powers. As defined herein, one set of wavelengths is said to be different from another set of wavelengths if the sets of wavelengths are not identical. For example, a first set of four wavelengths $\lambda_{11}$ through $\lambda_{14}$ is different from a second set of four wavelengths, $\lambda_{21}$ through $\lambda_{24}$, if $\lambda_{11}$ through $\lambda_{13}$ are identical to $\lambda_{21}$ through $\lambda_{23}$, respectively, but $\lambda_{14}$ is different from $\lambda_{24}$. Of course, all of the wavelengths of a set may be different from the corresponding wavelengths of all the other sets, i.e., the sets of wavelengths may be entirely different.

The individual radiation emitters 114 of a particular pump radiation source 110 emit radiation at the respective wavelengths of the set of wavelengths of that particular pump radiation source. For example, for the ith pump radiation source providing radiation at wavelengths $\lambda_{i1}$ to $\lambda_{imi}$, the individual radiation emitters 114 of the ith pump radiation source 110 respectively emit radiation at wavelengths $\lambda_{i1}$ to $\lambda_{imi}$.

Alternatively, any or all of the pump radiation sources 110 may comprise a single radiation emitter that simultaneously emits radiation at the wavelengths of the set of wavelengths of the pump radiation emitter. For example, the ith pump radiation source may comprise a single radiation source that simultaneously emits radiation at wavelengths $\lambda_{i1}$ to $\lambda_{imi}$.

Each pump radiation combiner 112 couples or combines the radiation at the wavelengths of the set of wavelengths of a respective pump radiation source 110. For example, the ith pump radiation combiner 112 couples the radiation from the ith pump radiation source 110. However, a combiner 112 may couple the radiation of a plurality of sources 110, or a plurality of combiners 112 may couple radiation from a single source 110. The combiner 112 may be, for example, a WDM multiplexer.

The coupled radiation output by each combiner 112 has its own coupled radiation profile, which will be a combination of the radiation profiles of the radiation input into the combiner 112. The coupled radiation profiles output from the combiners 112 are optically coupled to a respective one of N input ports of the coupler 118, which couples or combines the received coupled radiation profiles. The coupler 118 may be, for example, a fused fiber coupler or a waveguide coupler.

The combined coupled radiation profiles correspond to a counter-propagating pump, which is output from each of M output ports of the coupler 118. Because the coupler 118 combines the coupled radiation profiles input into the coupler 118, the counter-propagating pump output from each of the M output ports has the spectral shape of the combined coupled radiation profiles. Thus, the counter-propagating pump has a contribution from all of the individual wavelengths of the N pump radiation sources 110. The power of the counter-propagating pump, however, will be less than the power of the combination of the coupled radiation profiles because the coupler 118 splits the total input power among the M output ports.

Counter-propagating pumps ($CP_1$–$CP_M$) are output from each of the M output ports of the coupler 118 to a respective one of the pump-signal combiners 122. Each of the pump-signal combiners 122 optically couples a respective one of M data signals $DS_1$–$DS_M$ with a respective one of the counter-propagating pumps $CP_1$–$CP_M$ output by the coupler 118. The counter-propagating pumps $CP_1$–$CP_M$ provide Raman amplification of the data signals $DS_1$–$DS_M$. The number of counter-propagating pumps output from the M output ports of the coupler 118 is preferably equal to the number of pump signal combiners 122, although the number of counter-propagating pumps and output ports may be more or less than the number of pump signal combiners 122.

Like the coupler 60 in the architecture of FIG. 5 for generating the forward pump, the coupler 118 in the architecture of FIG. 6 for generating the counter-propagating pump has N input ports and M output ports. The values of N and M may similarly be equal to or different from each other. In one aspect of the present invention, the values of N and M are each at least two, such that the coupler 118 is at least a 2×2 coupler. In another aspect of the present invention, the values of N and M are each four, which corresponds to a 4×4 coupler. Where the values of N and M are each at least two, multiple pump wavelengths are combined to form multiple coupled radiation profiles, which are combined to form the counter-propagating pump, and the counter-propagating pump is placed on multiple optical fibers. As a result, each of the optical fibers shares the counter-propagating pump, which comprises multiple pump wavelengths, generated from a single common arrangement of pump radiation sources.

The architecture for generating the counter-propagating pump shown in FIG. 6 also provides a redundancy scheme for providing the counter-propagating pump to multiple optical fibers. If one of the multiple pump radiation sources fails, the other pump radiation sources still generate pump wavelengths that are combined to form the counter-propagating pump received by each of the optical fibers. In addition, if one of the pump radiation sources fails, the power of the remaining pump radiation sources may be increased so that the power of the counter-propagating pump remains approximately the same.

Figure 7:
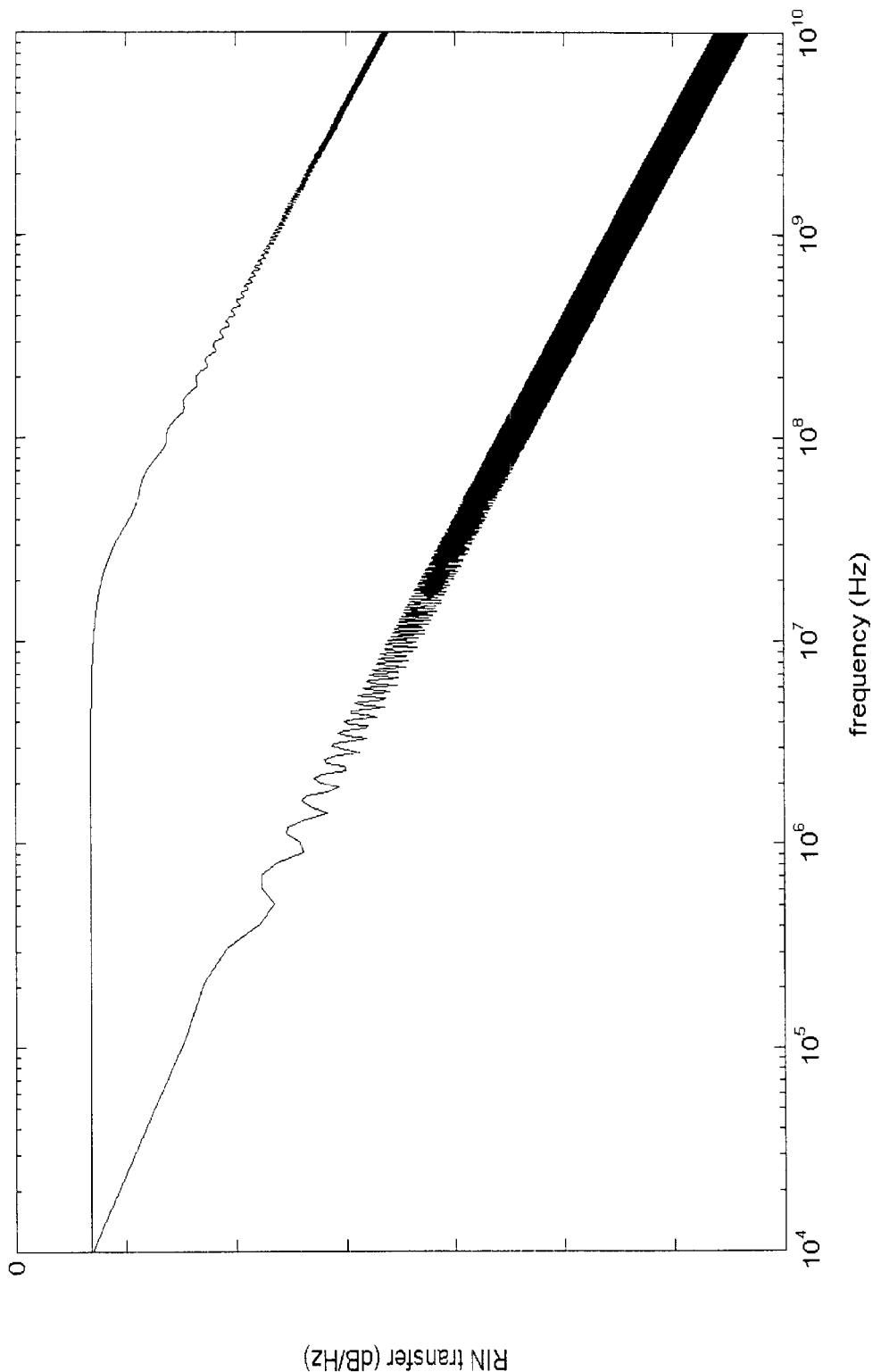
FIG. 7 shows an example of noise transfer functions for forward and backward pumps.

In addition to amplifying the data signals, noise from the pump lasers generating the forward and backward pumps is transferred to the data signals. For the backward pump, the higher frequency noise of the pump laser is averaged out as the data signals and the backward pump are propagating in opposite directions, which significantly reduces the bandwidth of relative intensity noise (RIN) transfer. For the forward pump, however, the pump and data signals travel together along the fiber. As a result, the noise transfer bandwidth is reduced only by averaging due to the different velocities of the pump and data signals due to fiber dispersion. FIG. 7 shows an example of the noise transfer functions for both forward and backward pumps. As shown in FIG. 7, the RIN transfer has an impact with both pumping configurations for low frequency noise.

Combining pump radiation sources, such as shown in the forward pump architecture in FIG. 5, results in a reduced effective RIN pump output. This reduction is due to the lack of correlation of the noise of multiple pump radiation sources, which results in an optical noise power equal to the square root of the sum of the squared variances. The total optical powers add linearly, however. For equal laser powers and noise levels, the result should be a $1/N^{1/2}$ reduction in the ratio of the optical noise to optical power, or a $1/N$ reduction in the RIN, as defined in the electrical domain.

The shared pumping schemes, such as shown in FIGS. 5 and 6, have multiple combined pumps, which reduces the effective RIN impacting the data signals. This reduction in the effective RIN has more value for the shared forward pumping scheme where the RIN transfer function is broader and therefore transfers more of the pump laser noise to the data signals.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A pump assembly for an optical amplifier, comprising:
   a first plurality of pump radiation sources, each pump radiation source producing radiation at a respective one of a first number of pump wavelengths, at least some of the first number of pump wavelengths having different wavelengths;
   a first coupler, optically coupled to each of the plurality of pump radiation sources, which receives the radiation at each of the first number of pump wavelengths from the first plurality of pump radiation sources and outputs the radiation at each of the first number of pump wavelengths to each one of a second number of outputs;
   a first plurality of pump signal combiners, each pump signal combiner optically coupled to a respective one of the second number of outputs of the first coupler and receiving the radiation at each of the first number of pump wavelengths output from the first coupler, each pump signal combiner placing the radiation at each of the first number of pump wavelengths output from the first coupler in co-propagation with a respective one of a plurality of data signals propagating on a respective one of a plurality of optical fibers, to provide stimulated Raman scattering amplification in the plurality of optical fibers;
   a second coupler having outputs corresponding to the second number, which receives radiation at each of a third number of pump wavelengths from a second plurality of pump radiation sources and outputs the radiation at each of the third number of pump wavelengths to each one of the second number of outputs of the second coupler, the range of pump wavelengths for the third number of pump wavelengths being substantially greater than the range of pump wavelengths for the first number of pump wavelengths; and a second plurality of pump signal combiners, each pump signal combiner optically coupled to a respective one of the second number of outputs of the second coupler and receiving the radiation at each of the third number of pump wavelengths output from the second coupler, each pump signal combiner placing the radiation at each of the third number of pump wavelengths output from the second coupler in counter-propagation with a respective one of the plurality of data signals propagating on a respective one of the plurality of optical fibers, to provide stimulated Raman scattering amplification in the plurality of optical fibers.

2. The pump assembly of claim 1, wherein the first number and the second number are each at least two.

3. The pump assembly of claim 2, wherein the first number and the second number are equal.

4. The pump assembly of claim 2, wherein the first number and the second number are not equal.

5. The pump assembly of claim 2, wherein the first number and the second number are each four.

6. The pump assembly of claim 1, wherein each of the first number of pump wavelengths have approximately the same wavelength.

7. The pump assembly of claim 1, wherein the difference in wavelength between the shortest pump wavelength and the longest pump wavelength is approximately 10 nm.

8. The pump assembly of claim 1, wherein the radiation at the first number of pump wavelengths interact with the data signals propagating on the optical fibers to amplify the data signals.

9. The pump assembly of claim 1, wherein the third number is substantially greater than the first number.

10. The pump assembly of claim 1, wherein the optical amplifier is adapted to provide stimulated Raman scattering amplification in the plurality of optical fibers.

11. The pump assembly of claim 1, wherein each pump radiation source comprises one or more radiation emitters, each of the one or more radiation emitters emitting radiation at a respective one of the first number of pump wavelengths.

12. The pump assembly of claim 11, wherein the radiation emitters are lasers or light emitting diodes.

13. A method of amplifying optical data signals, comprising:

providing radiation at a first number of pump wavelengths into the inputs of a first coupler, at least some of the first number of pump wavelengths have different wavelengths;

outputting the radiation at each of the first number of pump wavelengths from each of a second number of outputs of the first coupler;

placing the radiation at each of the first number of pump wavelengths output from the first coupler in co-propagation with a respective one of a plurality of data signals propagating on a respective one of a plurality of optical fibers to provide stimulated Raman scattering amplification in the plurality of optical fibers;

providing radiation at each of a third number of pump wavelengths to a second coupler having outputs equal to the second number, the range of pump wavelengths for the third number of pump wavelengths being substantially greater than the range of pump wavelengths for the first number of pump wavelengths;

outputting the radiation at each of the third number of pump wavelengths to each one of the second number of outputs of the second coupler; and placing the radiation at each of the third number of pump wavelengths output from the second coupler in counter-propagation with a respective one of the plurality of data signals propagating on a respective one of the plurality of optical fibers, to provide stimulated Raman scattering amplification in the plurality of optical fibers.

14. The method of claim 13, wherein the first number and the second number are each at least two.

15. The method of claim 14, wherein the first number and the second number are equal.

16. The method of claim 14, wherein the first number and the second number are not equal.

17. The method of claim 14, wherein the first number and the second number are each four.

18. The method of claim 13, wherein each of the first number of pump wavelengths have approximately the same wavelength.

19. The pump assembly of claim 13, wherein the difference in wavelength between the shortest pump wavelength and the longest pump wavelength is approximately 10 nm.

20. The method of claim 13, wherein the first number of pump way wavelengths interact with the data signals propagating on the optical fibers to amplify the data signals.

21. The method of claim 13, wherein the third number is substantially greater than the first number.

* * * * *